US006453432B1

(12) United States Patent
Pesetski et al.

(10) Patent No.: US 6,453,432 B1
(45) Date of Patent: *Sep. 17, 2002

(54) METHOD AND SYSTEM FOR COMMUNICATING THE STATUS OF A DIGITAL TRANSMISSION LINE ELEMENT DURING LOOPBACK

(75) Inventors: Peter W. Pesetski, West Chicago, IL (US); Nicholas J. Arnone, Wilkes-Barre, PA (US)

(73) Assignee: Westell Technologies, Inc., Aurora, IL (US)

( * ) Notice: Subject to any disclaimer, the term of this patent is extended or adjusted under 35 U.S.C. 154(b) by 34 days.

This patent is subject to a terminal disclaimer.

(21) Appl. No.: 09/652,881

(22) Filed: Aug. 31, 2000

Related U.S. Application Data

(63) Continuation of application No. 09/229,532, filed on Jan. 13, 1999, which is a continuation of application No. 08/951,121, filed on Oct. 16, 1997, now Pat. No. 5,889,785, which is a continuation of application No. 07/943,859, filed on Sep. 11, 1992, now Pat. No. 5,680,405.

(51) Int. Cl.[7] .................... H02H 3/05; H03K 19/003
(52) U.S. Cl. ........................... 714/713; 714/716
(58) Field of Search ................... 714/713, 716, 714/821, 717, 788, 824

(56) References Cited

U.S. PATENT DOCUMENTS

| | | | | |
|---|---|---|---|---|
| 4,425,662 A | * | 1/1984 | Jeandot .................. | 714/713 |
| 4,545,013 A | * | 10/1985 | Lyon et al. ............. | 714/712 |
| 4,630,268 A | * | 12/1986 | Rodenbaugh ........... | 714/716 |
| 4,635,260 A | * | 1/1987 | Sestan .................... | 714/713 |
| 4,813,044 A | * | 3/1989 | Kumar et al. ........... | 714/809 |
| 4,937,825 A | * | 6/1990 | Ballard et al. .......... | 714/712 |
| 4,980,887 A | * | 12/1990 | Dively et al. ........... | 714/713 |
| 5,216,697 A | * | 6/1993 | Ohnuki .................. | 375/347 |
| 5,224,149 A | * | 6/1993 | Garcia ................... | 379/5 |
| 5,317,278 A | * | 5/1994 | Miller et al. ............ | 327/552 |
| 5,555,274 A | * | 9/1996 | Sheets .................... | 375/257 |
| 5,680,405 A | * | 10/1997 | Pesetski et al. ......... | 714/713 |
| 5,889,785 A | * | 3/1999 | Pesetski et al. ......... | 714/713 |
| 6,151,691 A | * | 11/2000 | Pesetski et al. ......... | 714/713 |

OTHER PUBLICATIONS

"3150–56 T1 Line Repeater with Addressable Loopback Plus," General Description, Installation & Maintenance Practice, Section 3150–56–100 Issue A, @Westell, Inc. Jul. 1992, printed in USA Oct. 1992.*

* cited by examiner

*Primary Examiner*—Dieu-Minh Le
(74) *Attorney, Agent, or Firm*—McDonnell Boehnen Hulbert & Berghoff

(57) ABSTRACT

A method and system for reporting the status of a digital transmission line element, such as a regenerative repeater or a network interface unit, to a remote location. The line element is interconnected to a digital transmission line and receives a data stream via the transmission line from the remote location. The data stream follows predetermined coding rules. In a loopback mode, the line element loops back the data stream via the transmission line to the sending end. The line element includes a detector and an error generator. The detector senses a status query signal in the data stream and responsively enables the error generator to then selectively introduce error message into the data stream being looped back along the transmission line. The error message may then be detected at a remote location to a provide information regarding the line element, such as its location or operating mode.

17 Claims, 7 Drawing Sheets

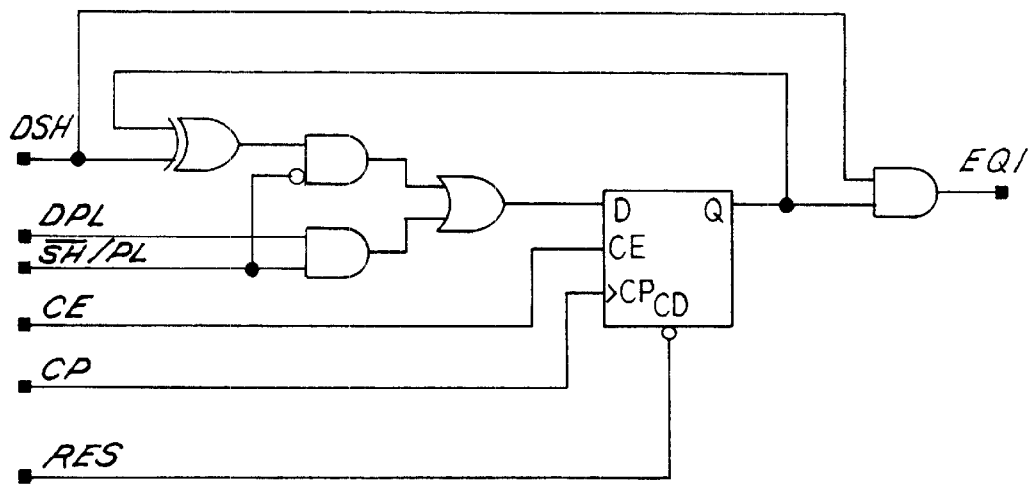
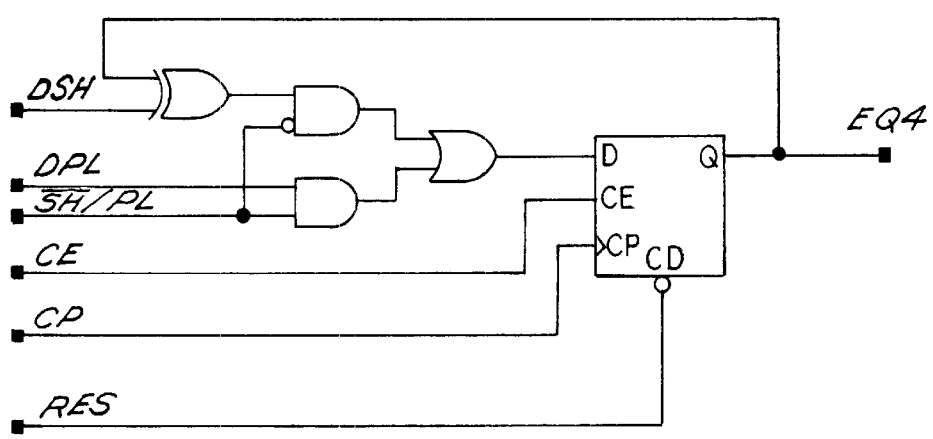

METHOD AND SYSTEM FOR COMMUNICATING THE STATUS OF A DIGITAL TRANSMISSION LINE ELEMENT DURING LOOPBACK

CROSS REFERENCE TO RELATED APPLICATIONS

This is a continuation of U.S. patent application Ser. No. 09/229,532, filed Jan. 13, 1999, which is a continuation of U.S. patent application Ser. No. 08/951,121, filed Oct. 16, 1997, and issued as U.S. Pat. No. 5,889,785 on Mar. 30, 1999, which is a continuation of U.S. patent application Ser. No. 07/943,859, filed Sep. 11, 1992, and issued as U.S. Pat. No. 5,680,405 on Oct. 21, 1997.

BACKGROUND OF THE INVENTION

The present invention relates generally to remote reporting systems for elements in digital transmission line systems and, more particularly, to a digital line element such as a repeater or network interface unit (NIU) that may remotely report its status (such as its operating mode or location) to a remote facility interconnected to a digital transmission line. In this way, for example, the invention may assist a telephone company technician in identifying, from a test location, the location of a malfunctioning line element among a string of line elements such as multiple repeaters and an NIU.

The present invention may be used with digital transmission lines generally, including, for example, the Bell Telephone System in the United States. The data, or "payload", signals on such transmission lines are typically sent differentially on a Tip-Ring pair. Payload signals are received by the telephone company central office, and generally, are transmitted, via cables, to a series of regenerative signal repeaters and an NIU in a T1 span line. Such repeaters are spaced along the cables approximately every 6,000 feet. The first repeater receives the data from the central office, but, because of transmission line losses, noise, interference, and distortion, the signal will have degenerated. The repeater recognizes the presence or absence of a pulse at a particular point in time and thereafter, if appropriate, regenerates, or "builds up," a clean, new pulse. The first line repeater (or "signal repeater" or "regenerative repeater") sends the regenerated, or repeated, signal to the next line repeater, stationed approximately one mile away. The last repeater then transmits its pulses to an NIU at the remote end of the span line typically located at the point of demarcation between the network and the customer premises.

The Bell Telephone System has widely utilized time multiplexed pulse code modulation systems. Such systems have generally been designated as "T carriers." The first generation of multiplexers designed to feed the T1 system was the D1 channel bank. Channel banks have evolved through the D5 series. The "D" channel bank provides multiple DS-1 signals that are carried on the T1 systems. Each T1 system carries twenty-four two-way channels on two pairs of exchange grade cables. One pair of cables provides communication in each direction.

The data to be transmitted over the cables, such as speech, may be sampled at a rate of 8,000 hertz, and the amplitude of each signal is measured. The amplitude of each sample is compared to a scale of discrete values and assigned a numeric value. Each discrete value is then encoded into a binary form. Representative binary pulses appear on the transmission lines.

The binary form of each sample pulse consists of a combination of seven pulses, or bits. An eighth bit is added to the end of the combination, or byte, to allow for signaling. Each of the twenty-four channels on the T1 system is sampled within a 125 microsecond period (equivalent to $\frac{1}{8,000}$ of a second). The period is called a "frame." Within each frame, an additional, synchronizing bit is added in order to signal the end of a frame. Otherwise, a single error might cause future representations of the data on the transmission line to be misunderstood by the receiving apparatus.

Since there are eight bits per channel and there are twenty-four channels, and there is one pulse at the end of each frame, the total number of "bits" needed per frame is 193. Thus, the resulting line bit rate for T1 systems is 1.544 million bits per second.

A coding system is typically used to convert the analog signal to a digital signal. The system guarantees some desired properties of the signal, regardless of the pattern to be transmitted. The most prevalent code in the United States is bipolar coding with an all zero limitation (also called "AMI" for Alternative Mark Inversion).

With bipolar coding, alternate "ones" are transmitted as alternating positive and negative pulses, assuring a direct current balance and avoiding base-line wander. Further, an average density of one pulse in eight slots, with a maximum of fifteen zeros between "ones," is required. This is readily obtained in voice-band coding, however, by simply not utilizing an all-zero word.

Another arrangement, also used to guarantee density with a bipolar code, replaces strings of zeros with two successive pulses of the same polarity, allowing its identification and removal at the receiving end. This arrangement, called B8ZS (for Bipolar with 8-Zero Substitution) is also in considerable use. Other coding arrangements (such as B3Zs and 4B3T) have also been established.

Signals that violate the rules established in a particular system are detected as types of errors. Thus, for example, under a bipolar coding scheme, two positive pulses should never occur in sequence (except in B8ZS encoded all-zeros). To the extent such pulses do occur adjacent to each other, such a signal may be noted as a bipolar violation. Test sets applied to digital transmission cables may detect the number of bipolar violations over a predetermined period of time to test the operational integrity of the transmission lines.

There may be many miles of cable between the central office and the customer premises, with a large number of repeaters between the two facilities. Thus, if the malfunction of a transmission line is detected during a test (or simply during normal operation), it is important to make an accurate determination of the location of the fault. In this way, the fault may be located and corrected more quickly and inexpensively.

Furthermore, to assist in the testing of transmission lines and correction of faults, a technician may wish a repeater, an NIU or another transmission line element to identify not only its location with respect to the test set, but also (or alternatively) its condition. For example, a repeater may be able to enter a particular operating mode, such as "logical loop back" or "metallic loop back," and a technician may command the repeater to communicate back to the technician that it is in such a mode.

Also, for example, if a repeater detects that an adjacent repeater or span of transmission cable is not functioning, the repeater may move to an open power loop mode, signifying that the adjacent span or repeater is malfunctioning. The repeater that is reporting the malfunction should be able to identify itself to a testing technician so that the technician may more readily locate the fault.

Further, a repeater may, for example, be in a loop back mode as result of commands issued by a first technician. A second technician may wish to know which repeater has been placed in the loop back mode. The repeater in the loop back mode should be able to identify its location and condition to the second technician, such that more efficient testing and repair of the transmission lines may be effected.

Still further, for example, a technician positioned remotely from an NIU may wish the NIU to report on the status or condition(s) of the network transmission lines and/or the conditions of the customer premises equipment and customer transmission lines. In response, the NIU should be able to communicate such information to the requesting technician.

Unfortunately, many of the presently available apparatus and methods for communicating with transmission line elements, such as repeaters and NIUs, are cumbersome and expensive to manufacture. The presently available reporting systems often substantially increase the size, weight, and complexity of the line elements. Moreover, such systems may involve the use of specialized codes, such that the technicians must utilize modified line elements as well as new, specially designed test equipment in order to allow the test equipment and line elements to communicate with each other.

SUMMARY OF THE INVENTION

In a principal aspect, the present invention is an apparatus for allowing a line element, such as a repeater or NIU, to communicate with other equipment at a remote location. The apparatus is interconnected to a digital transmission line carrying a stream of coded data and preferably includes both a detector and an error generator. The detector senses a status inquiry and responsively produces an initiation signal. The initiation signal is received by the error generator, which, in turn, responsively introduces into the data stream an error or burst of errors. The error or burst of errors corresponds to status information, which may include, for example, a code identifying the particular element, the location of the element, the operating mode that the element happens to be in, or the operating mode of the transmission lines interconnected to the line element. This error or burst of errors may then be detected by remote test equipment.

In another embodiment, the invention is a repeater interconnected to both incoming and outgoing digital transmission lines. Again, the incoming transmission line carries a data stream of coded signals. The repeater includes a build-out circuit as well as the detector and the error generator. The build-out circuit receives the incoming data stream and responsively produces a repeated data stream along the outgoing transmission line. The detector senses the inquiry signal and responsively causes the error generator to introduce an error or burst of errors into the repeated data stream. The error or burst of errors again corresponds to the status of the repeater. Again, the status may be either the location or an identification of the element, or the operating mode or other information regarding the repeater.

More generally, an aspect of the present invention is a method of transmitting status data from a transmission line element to a remote location. The method includes detecting a status inquiry and responsively introducing a predefined set of errors ("error message" or "error response message") into a data stream carried by the digital transmission line. The error response message corresponds to the status of the transmission line element.

Thus, an object of the present invention is an improved remote reporting system for a digital transmission line element. Another object is an improved repeater that is smaller and lighter in weight.

Still another object is a line element such as a repeater or NIU that may communicate with a remote location with less need for modification of the line element and with less need for the use of specialized circuitry to decode the signal generated by the line element. Yet still another object is a line element that may more easily communicate with presently available testing equipment regarding its status or mode of operation. These and other objects, features, and advantages of the present invention are discussed or apparent in the following detailed description.

BRIEF DESCRIPTION OF THE DRAWINGS

A preferred embodiment of the present invention is described herein with reference to the drawing wherein:

FIG. 7 is a schematic diagram of the middle flip-flop circuits used in the error interface shown in FIG. 5; and FIG. 8 is a schematic diagram of the end flip-flop circuit used in the error interface shown in FIG. 5.

DETAILED DESCRIPTION OF THE PREFERRED EMBODIMENT

Figure 1:
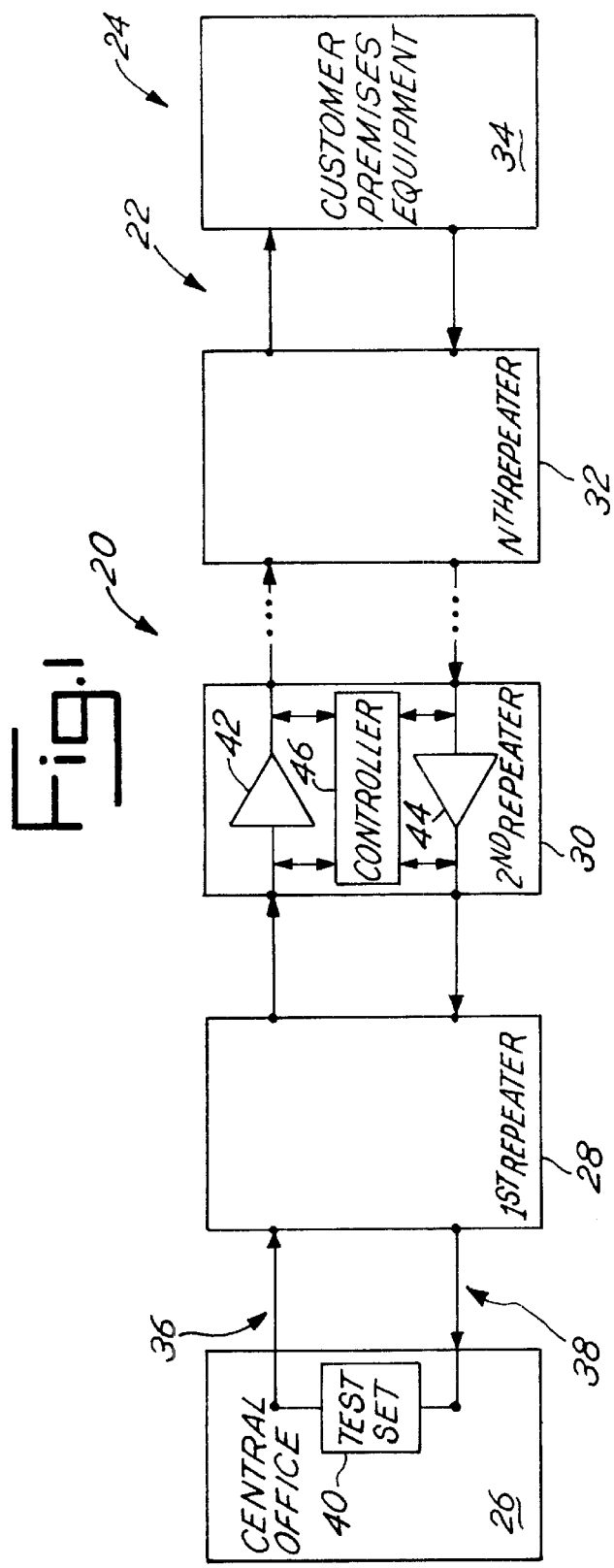
FIG. 1 is a block diagram of a preferred embodiment of the present invention, as implemented in a line repeater interconnected to digital transmission lines.

Referring to FIGS. 1–8, a preferred embodiment of the present invention is shown as a remote reporting system 20 for digital transmission lines 22. As shown in FIG. 1, existing digital transmission facilities 24 include, in addition to the lines 22, a central office 26, a plurality of line repeaters (designated as a first line repeater 28, a second line repeater 30 and an "Nth" line repeater 32), an NIU 33, and customer premises equipment 34. The digital transmission lines 22 include first and second pairs of exchange grade transmission cables 36, 38 interconnecting the central office 26, line repeaters 28–32, NIU 33 and customer premises equipment 34. to The central office 26 may include test equipment, such as a test set 40 (which may be, for example, a Hewlett Packard 37701A test set) applied between the first and second pairs of cables 36, 38. The test set 40 may apply signals to the cables 36, 38 to run diagnostic tests on the transmission facilities 24 to determine their integrity and to find faults in the system. The test set 40, however, may also be interconnected anywhere else between the two pairs of cables 36, 38 including, for example, at the customer premises equipment 34. The test set 40 is shown in the central office 26 in FIG. 1 for purposes of illustration.

Also, for purposes of illustration, only the second repeater 30 is described in greater detail below, although all repeaters or other line elements, such as the NIU 31, may also include the remote reporting system 20. The repeater 30 includes first and second build-out circuits 42, 44 and a controller 46 interconnected between the two pairs of cables 36, 38.

The repeater 30 receives an incoming data stream along the cables 36 and responsively provides a regenerated signal. During normal operation, the regenerated output from the build-out circuit 42 is transmitted further along the cables 36 to the other repeaters and ultimately to the customer premises equipment 34.

In other instances, the repeater 30 may be switched, for example, to a loop back mode, where the output of the build-out circuit 42 is redirected back toward the central office 26 along the cables 38 toward the test set 40. In this situation, the test set 40 may apply a signal along the cables 36 to test the second repeater 30. Upon receiving substantially the same signal back along the cables 38, a technician may determine that the lines 22, up to the point where the repeater 30 has "looped back" the test signal, are working correctly. Conversely, a failure to receive the transmitted signal along the second pair of cables 38 (when the first repeater 28, but not the fir second repeater 30, correctly performed a loop back) suggests that a malfunction in the digital transmission lines 22 exists somewhere between where the signal did loop back in the first repeater 28 and where the signal should have looped back in the second repeater 30.

For purposes of the present description, the portion of the cables 36, upon which the build-out circuit 42 receives an incoming data stream, is referred to as the incoming data transmission line. The portion of the cables upon which the output of the build-out circuit 42 is applied, whether it be the rest of the cables 36 (between the repeater 30 and the NIU 31 at the customer premises equipment 34) or the cables 38 (between the repeater 30 and the central office 26) shall be referred to as the outgoing data transmission line, and the signal applied to this outgoing data transmission line shall be referred to as the repeated data stream.

Figure 2:
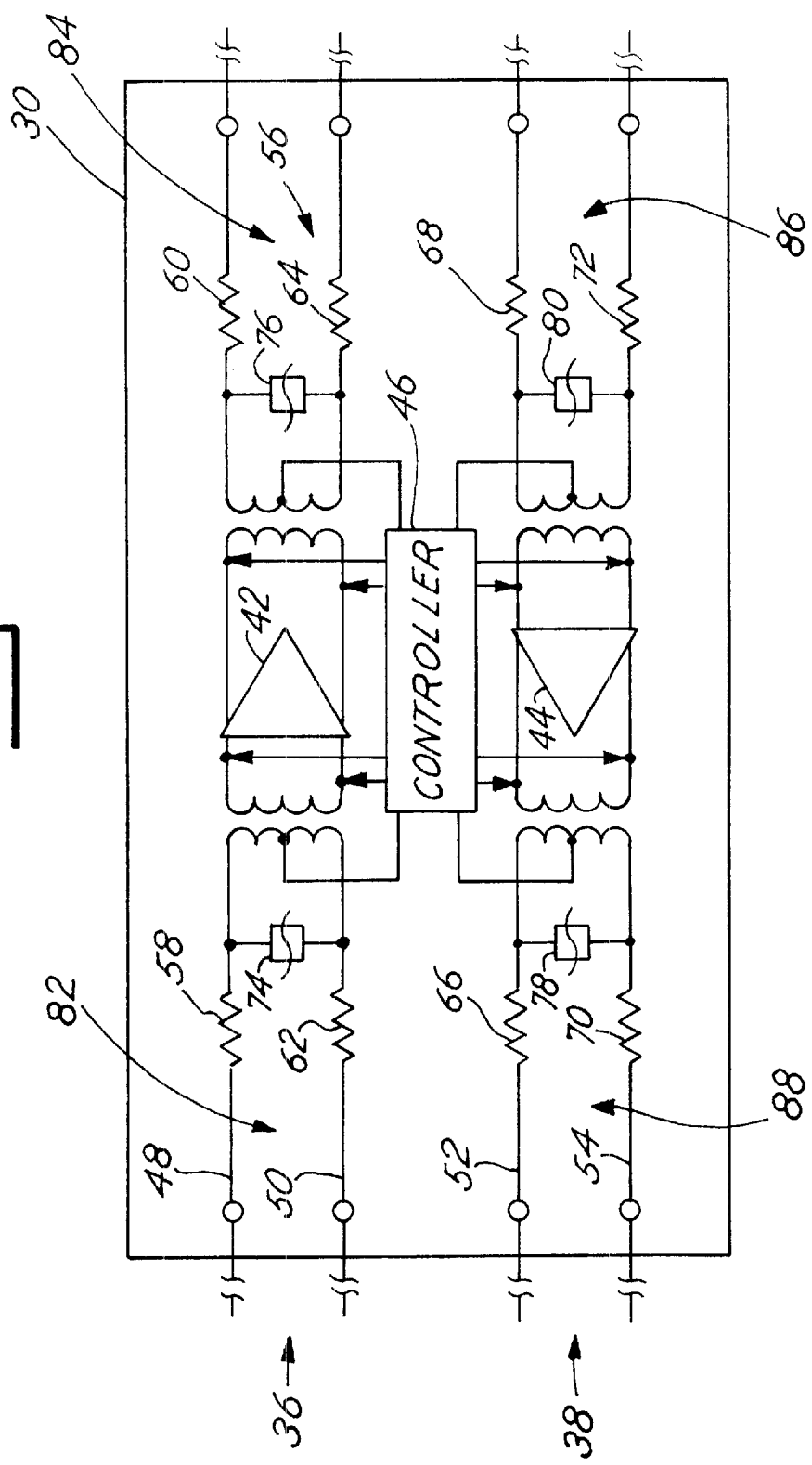
FIG. 2 is a schematic diagram of the repeater shown in FIG. 1.

The second repeater 30 is shown in more detail in FIG. 2. The first pair of cables 36 is identified as first and second cables 48, 50; similarly, the second pair of cables 38 is identified as first and second cables 52, 54. The first build-out circuit 42 is interconnected to the cables 48, 50, and the second build-out circuit 44 is interconnected to the cables 52, 54.

The repeater 30 also includes protection circuitry 56 to limit the damage to the repeater 30 and the transmission lines 22 should the lines 22 be struck by lighting or should power cross occur (where power cables are short-circuited against each other). Such overload protection circuitry 56 includes high wattage, current limiting resistors 58, 60, 62, 64, 66, 68, 70, 72 to limit the amount of current that will pass through a particular line when a high voltage is applied to it. Also, varistors 74, 76, 78 80 are placed across the cables 48, 50, 52, 54 to again limit the current when a high voltage is accidentally applied.

The repeater 30 divides the cables 48, 50 into first and second spans 82, 84, and the cables 52, 54 into first and second spans 86, 88. The controller 46 is interconnected all spans 82–88 of the cables 48–54. The controller 46 may include the "intelligence" of the repeater 30, that will allow the repeater 30 to respond to various conditions or signals that the repeater 30 receives, via the transmission lines or other methods. For example, the transmission lines 22 may provide a signal such that the controller 46 will responsively place the repeater 30 in a logical or metallic loop back condition.

In the preferred embodiment, the repeater 30 may identify itself according to a numerical code. Thus, for example, when called upon with a status inquiry to identify itself as the second repeater, it will identify itself with a burst of twenty errors. The "Nth" repeater 32 will provide a burst of "N" errors.

Such errors are preferably created every third "one" data bit. In the preferred embodiment, the errors do not occur on a framing bit nor do the errors occur where the payload is a zero. Errors in the preferred embodiment consist solely of converting non-framing bit "ones" into "zeros", which creates bi-polar violation errors and logic errors. It is recognized, of course, that the present invention may also, or alternatively, employ other types of errors or error message configurations.

If the second repeater 30 is operating in a loopback condition, the repeater 30 may, for example, provide a single burst of twenty-five errors. The first digit of the number of errors (two) may represent the repeater's position with respect to the central office 26. The second digit (five) may then be preselected code corresponding to a particular type of loopback condition that the repeater 30 is in. A code of twenty, in contrast, might indicate that the second repeater 30 is to operating in a standard transmission mode. Additionally, the repeater may send other error-based messages to report status of options or transmission impairments.

Figure 3:
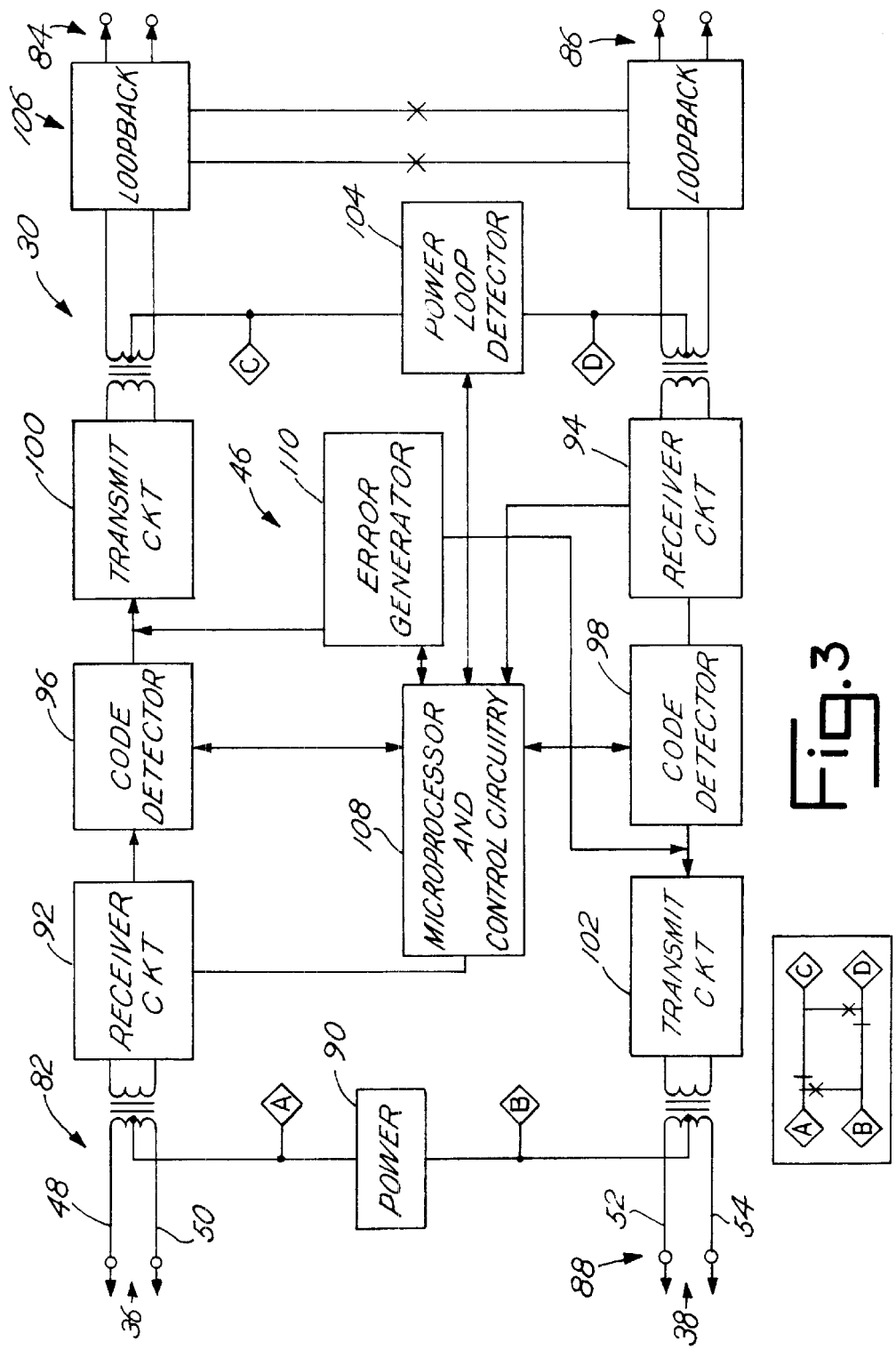
FIG. 3 is a detailed block diagram of the repeater shown in FIG. 2.

A more detailed block diagram of the repeater 30 is shown in FIG. 3. The repeater 30 is shown as a microprocessor-based system having the controller 46, a power supply 90, receiver circuitry 92, 94, code detector circuitry 96, 98, transmit circuitry 100, 102, a power loop detector 104, and loopback circuitry 106. The controller 46 includes microprocessor and control circuitry ("microprocessor") 108 and an error generator 110.

The operation of the elements associated with the cables 36 are explained for purposes of illustration. While in a normal transmission mode, the payload is applied to the first span 82 and is sensed by the receiver circuitry 92. The receiver circuitry 92 forwards the signal to the code detector 96 which senses, for example, whether a particular loopback code exists in the incoming data stream. If not, the transmit circuitry 100 then regenerates the signal and applies it to the second span 84 of the cables 36.

The power loop detector may sense an open transmission path on the spans between the second repeater 30 and the customer premises equipment 34. If this happens, the detector 104 signals the microprocessor 108, which, in turn, causes the loopback circuitry 106 to loopback all power and data signals.

The code detector 96 may sense that the repeater 30 should change its condition by, for example, switching to a loopback mode. The detector 96 signals the microprocessor 108, and the microprocessor 108 then applies a signal to the loopback circuitry 106, such that data signals received from the first span 82 are then transmitted, via the loopback circuitry 106, to the receiver circuitry 94 and, ultimately, to the second span 88 of the cables 38.

The code detector 96 also determines whether, for example, a test set 40 is requesting that the repeater 30 identify its status, such as the location of the repeater 30 (or other information regarding the repeater 30) or what operating mode (such as loopback, power loopback, or metallic loopback) the repeater 30 happens to be in. In such a case, the microprocessor 108 then applies a signal to the error generator 110, advising the error generator 110 that a particular status inquiry has been detected by the code detector 96.

Thus, in response to a coded query signal along the transmission line 22, the code detector 96 responsively causes the microprocessor 108 to provide an initiation signal to the error generator 110. In response, the error generator 110 introduces an error message into the data stream received along, for example, the first span 82. As a result, the repeated stream of data produced by the repeater 30 (on either the second span 84 of the cables 36 or the second span 88 of the cables 38) will include errors introduced to the data stream. The errors may then be detected and decoded at a remote location by the test set 40 in order to determine the response to the status inquiry previously made.

In the preferred embodiment shown, the repeater 30 generates a single, responsive coded burst of errors upon receiving a status inquiry. In an alternative embodiment, the burst of errors may be repeated periodically, at predetermined time intervals, such as every twenty seconds. The periodic burst of errors continues until the query signal that caused the errors to be produced originally is removed. The detector consequently provides a stop signal to the microprocessor 108, which in turn, advises the error generator 110 to stop producing periodic bursts of errors.

Figure 4:
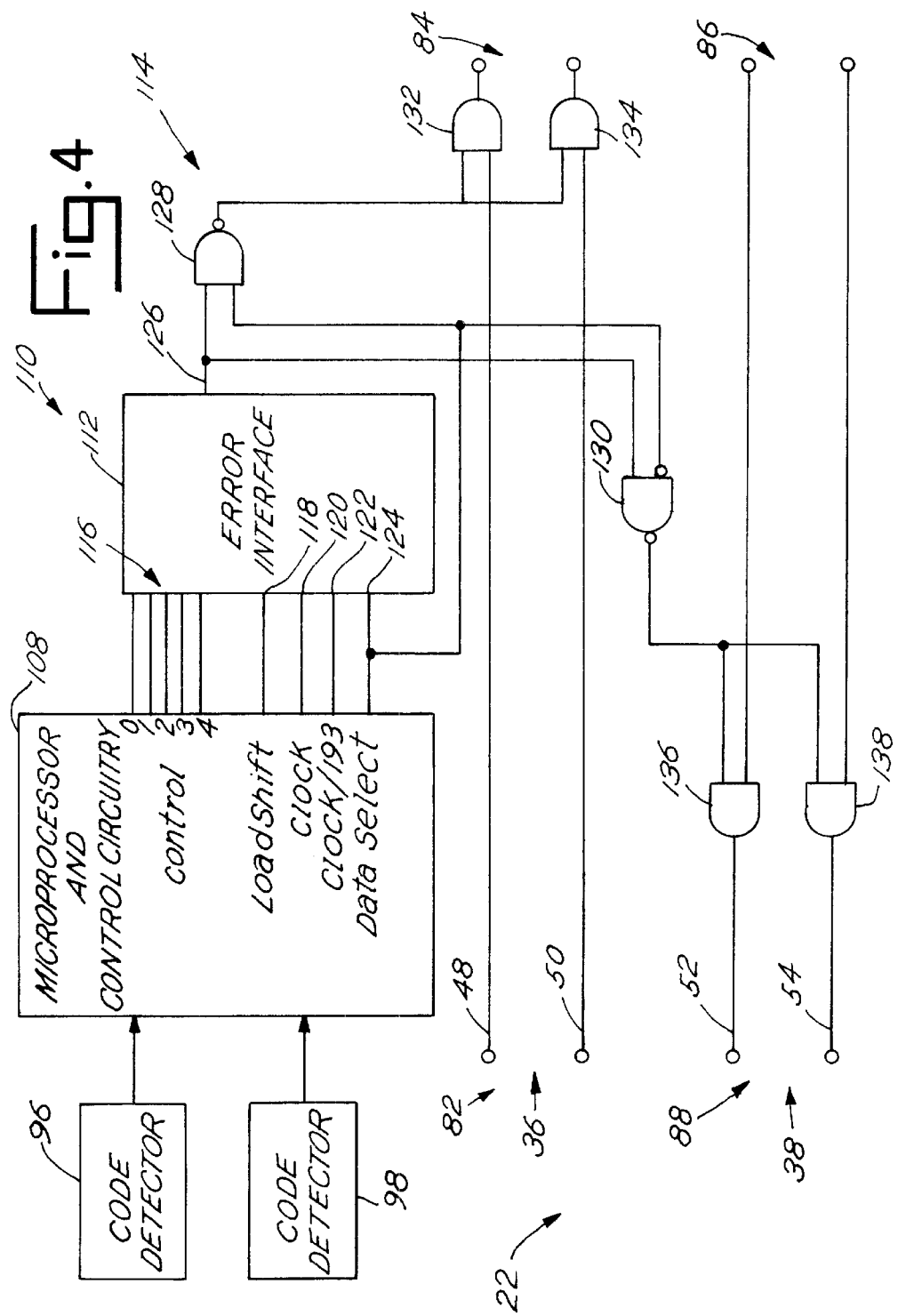
FIG. 4 is a schematic diagram of the controller shown in FIG. 1.

As shown in FIG. 4, the error generator 110 includes error interface circuitry 112 and error control circuitry 114. The error control circuitry 114 is interconnected to the cables 36, 38.

As shown in FIG. 4, upon receiving a code, indicating that status information should be introduced along the digital transmission lines 22, either of the code detectors 96, 98 may provide a signal to the microprocessor 108. The microprocessor 108 responsively provides an initiation signal to the error interface 112 which, in turn, provides signals to the error controller 114.

The microprocessor 108 communicates to the error generator via five control lines 116, a load shift line 118, a clock line 120, a clock synchronization ("clock/193") line 122, and a data select line 124. The error controller 114 selectively introduces errors into the stream of data on the digital transmission lines 22.

In a preferred embodiment, the error controller 114 shown in FIG. 4 includes an error introduction line 126, first and second NAND gates 128, 130, and four AND gates 132, 134, 136, 138. If an error is to be introduced along the cables 36, the data select line 124 is in a high state, and the error introduction line 126 is in a high state. Thus, two high inputs are provided to the NAND gate 128. Low signals are consequently supplied to the AND gates 132, 134. Accordingly, if high inputs are provided by the cables 48, 50 to the AND gates 132, 134, incorrect, low inputs will be provided by AND gates 132, 134 to the second span 84. A low signal along the first span 82 always results in a low signal being produced by the AND gates 132, 134. Accordingly, the error controller 114 only allows the introduction of errors to occur by converting "ones" into "zeros". "Zeros" are not converted into "ones." The embodiment, however, serves as an example only. In another embodiment, logic error and bi-polar violation error message responses could be generated by converting zeros into ones in a generalized solution.

Alternatively, if the data select line 124 is in a low state (and the error introduction line 126 is in a high state), then the NAND gate 130 allows errors to be introduced along the second span 88 of the second pair of cables 38.

The clock signal from the microprocessor 108 keeps the error interface 112 providing information in synchronization with the repeated data stream that the transmit circuitry 100, 102 generates. The load shift line 118 provides a pulse to move the data through the error interface 112. The clock synchronization line 122 effectively provides a pulse every 193 clock pulses. Thus, the clock synchronization line 122 provides a positive pulse whenever the transmit circuitry 100, 102 is regenerating a framing bit. In such a case, the error interface 112 is inhibited from producing an error signal along any output line.

Figure 5:
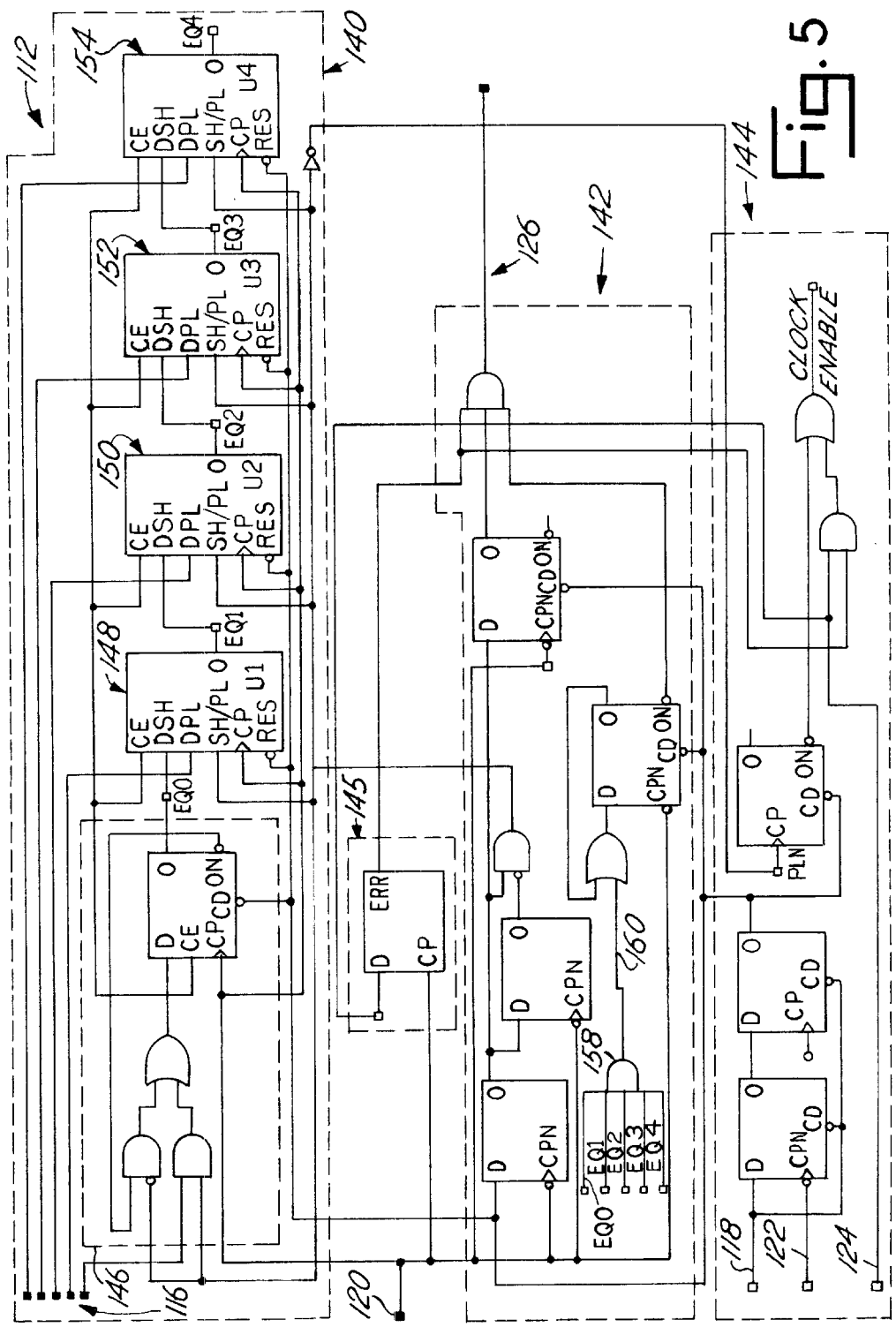
FIG. 5 is a schematic diagram of the error interface shown in FIG. 4.
Figure 6:
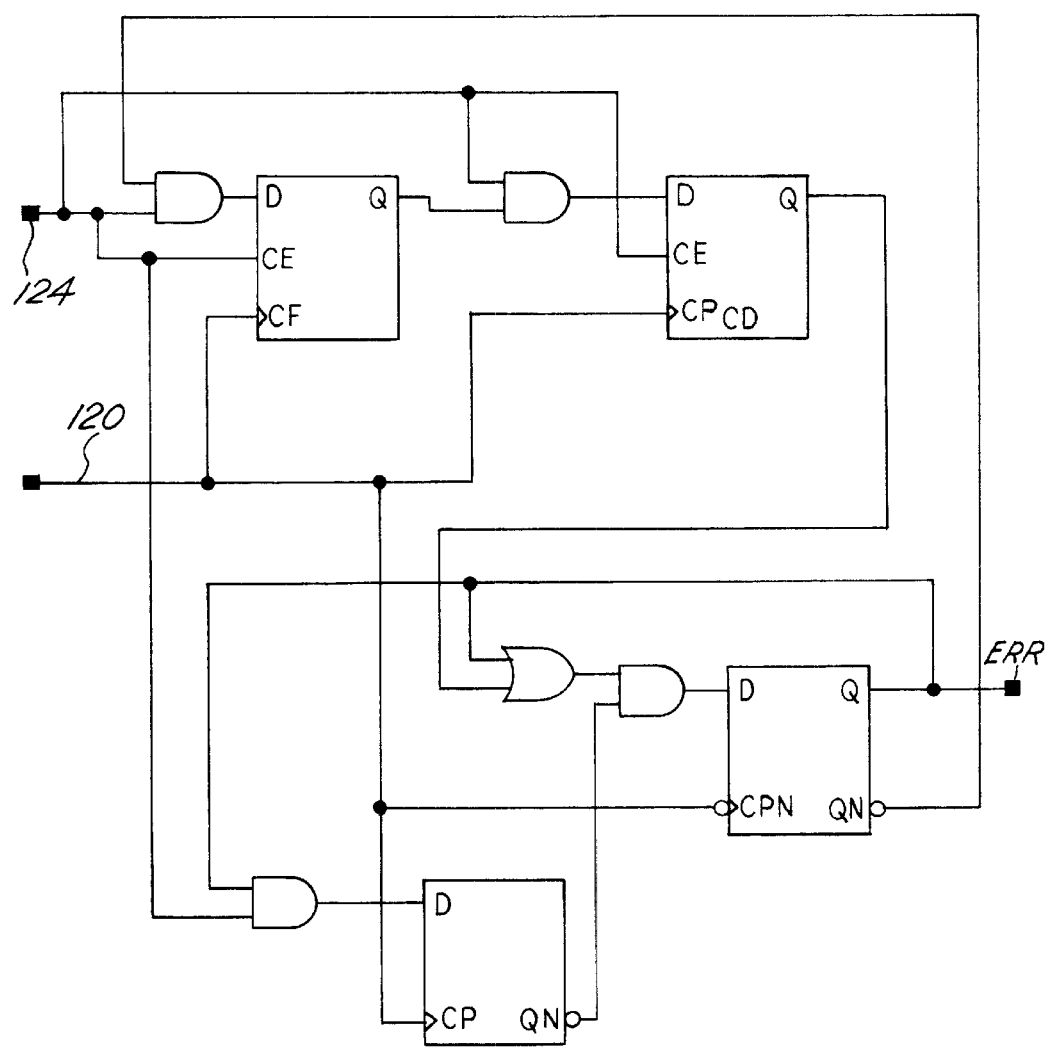
FIG. 6 is a schematic diagram of the error timing block used in the error interface shown in FIG. 5.

The error interface 122 is shown in more detail in FIG. 5. The error interface 112 includes a synchronous binary up counter ("parallel counter") 140, logical output circuitry 142, a framing bit and data alignment circuit 144, and an error timing block 145. The synchronous binary up counter 140 includes a front flip-flop 146, three middle flip-flop circuits 148, 150, 152, and an end flip-flop circuit 154.

The logical output circuitry 142 includes an AND gate 158 and a carry out line 160. The logical output circuitry 142 feeds the error line 126. The microprocessor 108 operates as a command generator to issue a command or initiation signal to the error interface 112. The command signal represents a predetermined number of errors that are to be introduced. The number is loaded in a parallel fashion from the microprocessor 108 into the parallel counter 140 via the control lines 116. If the error interface is to produce five errors, then the value of 26 (1AH, 11010 binary), which is 31–5, is loaded from the microprocessor 108. This allows the counter 140 to count up to 31.

When the counter 140 reaches 31 (1FH, 11111 binary), the errors are no longer produced.

The carry out line 160 maintains a low status until all five inputs to the AND gate 158 are again established at a high, or "one," level. When all five inputs have reached "one," the output of the AND gate 158 may go to a high position. The error introduction line 126 (FIGS. 4 and 5) may then go to a low state, so that no further errors are introduced into the data stream by the error interface 112.

The alignment circuit 144 prevents the error interface 112 from producing an error signal in lieu of framing bit. For every 193rd bit (framing bit), the alignment circuit 144 disables the clock enable inputs in each of the flip-flop circuits 146–154. On every 193rd bit, all five outputs of the flip-flops circuits 146–154 provide a high, or "one," output.

The error timing block 145 controls when the binary up counter 140 is incremented, which preferably occurs on every third data bit that is a "one". See FIG. 6.

Specific circuitry used to implement the middle flip-flop circuit 148 is shown in FIG. 7. This is substantially the same circuit used for the other middle flip-flop circuits 150, 152 as well. The circuitry to construct the end flip-flop circuit 154 is shown in FIG. 8.

Thus, for example, if the code detector 98 senses a query or status request and so notifies the microprocessor 108, and if the appropriate response were to introduce ten errors in a single burst of errors, the microprocessor 108 would first load the value of 21 into the counter 140, via the parallel load lines 116. Depending on which alternative is used, the microprocessor 108 may in delay a predetermined interval of time after receiving a signal from the code detector 98 (such as between four and eleven seconds) before sending the command signal to the error generator 110, to enable the error generator 110 to introduce errors into the repeated data stream.

The flip-flop circuits 146–154 would continue counting up errors until all ten errors had been introduced into the transmission line 22. The error line 126 would then stay at a low level, such that the output of the NAND gates 128, 130 are always high. Consequently, the outputs of the NAND gates 132–138 are high or low, depending solely on whether the incoming data are high or low. Thus, the repeater 30 would function without the introducing of any additional errors into the repeated data stream.

In an alternative embodiment, after the first burst of errors were introduced, the microprocessor 108 may thereafter periodically issue the same command signal to the error generator (causing another burst of errors) until one of the code detectors 96, 98 detects the removal of the query signal. Thereafter, the microprocessor 108 stops periodically issuing the command signal, until it is advised that another status inquiry has been made.

A preferred embodiment of the present invention has been described herein. It is to be understood, of course, that changes and modifications may be made in the embodiments shown without departing from the true scope and spirit of the present invention, as defined by the appended claims. For instance, where the present invention is incorporated in an NIU, the NIU may send a predetermined set of error messages to remote test equipment in order to report status information of transmission impairments or option settings.

We claim:

1. A method for communicating the status of a digital transmission line element, the digital transmission line element having a loop back mode in which the digital transmission line element receives a bit stream carried by an incoming transmission line from a remote location and loops the bit stream back along an outgoing transmission line to the remote location, the method comprising, in combination:

the digital transmission line element detecting a query signal in the bit stream carried by the incoming transmission line; and responsive to the query signal, the digital transmission line element introducing a number of bit errors into the bit stream being looped back along the outgoing transmission line, the number corresponding to the status of the digital transmission line element, whereby the number of bit errors may be counted at the remote location to facilitate a determination of the status of the digital transmission line element.

2. The method of claim 1, wherein the digital transmission line element is a repeater.

3. The method of claim 1, wherein the digital transmission line element is a network interface unit.

4. The method of claim 1, wherein the status comprises an identification of the digital transmission line element.

5. The method of claim 1, wherein the status comprises a location of the digital transmission line element.

6. The method of claim 1, wherein the status comprises an operating mode of the digital transmission line element.

7. The method of claim 1, wherein the status comprises a loopback mode of the digital transmission line element.

8. The method of claim 1, wherein introducing a number of bit errors into the bit stream being looped back comprises introducing at least one burst of bit errors into the bit stream being looped back.

9. A system for reporting the status of a digital transmission line element, the digital transmission line element having a loop back mode in which the digital transmission line element receives a bit stream carried by an incoming transmission line from a remote location and loops the bit stream back along an outgoing transmission line to the remote location, the system comprising, in combination:

a detector for sensing a query signal in the bit stream carried by the incoming transmission line and for responsively producing an initiation signal; and an error generator for receiving the initiation signal and responsively introducing a number of bit errors into the bit stream being looped back along the outgoing transmission line, the number corresponding to the status of the digital transmission line element, whereby the number of bit errors may be counted at the remote location to facilitate a determination of the status of the digital transmission line element.

10. The system of claim 9, wherein the digital transmission line element is a repeater.

11. The system of claim 9, wherein the digital transmission line element is a network interface unit.

12. The system of claim 9, wherein the status comprises an identification of the digital transmission line element.

13. The system of claim 9, wherein the status comprises a location of the digital transmission line element.

14. The system of claim 9, wherein the status comprises an operating mode of the digital transmission line element.

15. The system of claim 9, wherein the status comprises a loopback mode of the digital transmission line element.

16. The system of claim 9, wherein introducing a number of bit errors into the bit stream being looped back comprises introducing at least one burst of bit errors into the bit stream being looped back.

17. A method for communicating the status of a digital transmission line element to a remote location, the digital transmission line element having a loop back mode in which the digital transmission line element receives a bit stream carried by an incoming transmission line from the remote location and loops the bit stream back along an outgoing transmission line to the remote location, the method comprising, in combination:

the digital transmission line element detecting a query signal in the bit stream carried by the incoming transmission line; and responsive to the query signal, the digital transmission line element introducing an error message into the bit stream being looped back along the outgoing transmission line, the error message corresponding to the status of the digital transmission line element, whereby error message may be decoded at the remote location to facilitate a determination of the status of the digital transmission line element.

* * * * *